United States Patent [19]
Zeidler et al.

[11] 4,231,635
[45] Nov. 4, 1980

[54] COMMUNICATION CABLE WITH GLASS FIBER LIGHT WAVEGUIDES

[75] Inventors: Güenter Zeidler, Unterpfaffenhofen; Ulrich Oestreich, Munich, both of Fed. Rep. of Germany

[73] Assignee: Siemens Aktiengesellschaft, Berlin & Munich, Fed. Rep. of Germany

[21] Appl. No.: 905,230

[22] Filed: May 12, 1978

[30] Foreign Application Priority Data

May 27, 1977 [DE] Fed. Rep. of Germany ....... 2724155

[51] Int. Cl.³ ................................................ G02B 5/14
[52] U.S. Cl. ............................ 350/96.23; 350/96.30
[58] Field of Search ............... 350/96.23, 96.33, 96.30

[56] References Cited

U.S. PATENT DOCUMENTS

| 3,108,891 | 10/1963 | Charon et al. | 106/213 |
| 3,691,001 | 9/1972 | Takahashi et al. | 350/96.23 X |
| 4,072,400 | 2/1978 | Claypoole | 350/96.33 |
| 4,105,284 | 8/1978 | Olshansky | 350/96.33 |
| 4,113,349 | 9/1978 | Stiles | 350/96.23 |

FOREIGN PATENT DOCUMENTS

| 1409303 | 10/1975 | United Kingdom | 350/96.23 |
| 1487464 | 9/1977 | United Kingdom | 350/96.23 |

Primary Examiner—Stewart J. Levy
Attorney, Agent, or Firm—Hill, Van Santen, Steadman, Chiara & Simpson

[57] ABSTRACT

A communication cable having at least one light waveguide of a glass fiber provided with a close fitting casing characterized by the casing being prestressed in tension to exert a uniform constant longitudinal compression upon the glass fiber. The casing material, which may be a thermoplastic material selected from a group consisting of polyester, fluoropolymers, polyamides and polymethacrylates, can also be impregnated with filaments which are also placed in tension to apply a compressive force on the glass fiber.

8 Claims, 2 Drawing Figures

COMMUNICATION CABLE WITH GLASS FIBER LIGHT WAVEGUIDES

BACKGROUND OF THE INVENTION

1. Field of the Invention

The present invention is directed to a communication cable which has at least one glass light waveguide that is provided with a closely fitting casing (usually called a buffer).

2. Prior Art

In previously known waveguide cable constructions, the glass fiber is relieved of external forces as far as possible. For example, it can be loosely positioned within a tube as disclosed in British Pat. No. 1,487,464, which corresponds to German Offenlegungsschrift No. 2,528,991. In another type of construction, the glass fibers are loosely received in cable chambers as disclosed in British Pat. No. 1,409,303, which corresponds to German Offenlegungsschrift No. 2,347,408 or it may be packed in a soft cushioning layer, which may consist, for example, of silicon rubber, PU rubber, softly set polyamides or polyolefines. In either type, the glass fiber is thus protected from the influence of external forces. The reason for using these construction principles is due to the sensitivity of the glass fibers to microbends, which lead to a mixing of the light modes and to radiation and thus to an increase in the attenuation of the optical signal being carried by the fiber. For example, a periodic bending of a fiber, which bending has a mechanical wave length of 1 mm and an amplitude of only 1 $\mu$m, will lead to an additional attenuation of approximately 1 dB/km. In conventional cable construction in which the fibers rest loosely or are softly cushioned, only slight micro-bends occur and the additional attenuation due to the cabling is generally below 2 dB/km.

However, these constructions do have one disadvantage. The surface cracks, which determine the fiber strength, can slowly grow in the case of permanent tensile stresses being applied to the fiber, which tensile stresses are caused by the cable bend or by tensile force acting on the cable. Thus, in the course of time, this increasing of the size of the cracks due to the tensile stresses can lead to breaking of the light waveguide and the life duration is therefore limited. In conventional cable constructions, this life duration limit or expectancy is extended by permitting only very low permanent stresses on the cable, or by heavily reinforcing the cable by providing tension relief elements. The first solution limits possible uses for the cable and the second solution is extremely expensive. In addition to the above, the surface irregularities, which can form an origin for the fiber breakage or give rise to mutual friction of the optical fiber have been rendered harmless by treating the fiber prior to further processing. For example, the glass fibers may be provided with a wash such as described in U.S. Pat. No. 3,108,891 or a protective casing or coating.

SUMMARY OF THE INVENTION

The present invention is directed to rendering harmless the mechanical weaknesses inherent in the glass fibers without the assistance of special cable constructions.

To accomplish these goals, an improvement in a communication cable having at least one light waveguide or a glass fiber provided with a closely fitting casing is the casing being prestressed in tension to exert a uniform constant longitudinal compression upon the glass fiber. If desired, an intermediate layer may be interposed between the casing and the glass fiber, which intermediate layer will have a thickness of less than 10 $\mu$m. In addition, the casing may be impregnated with filaments selected from groups consisting of glass fibers, plastic such as aramide (aromatic polyamide) yarns, or steel which filaments are under tension to apply additional compression forces on the glass fiber of the waveguide. Instead of impregnating with the filaments, the surface of the casing may be provided with protective filaments under tension and then covered by a protective coating or additional casing layer.

DESCRIPTION OF THE PREFERRED EMBODIMENTS

Figure 1:
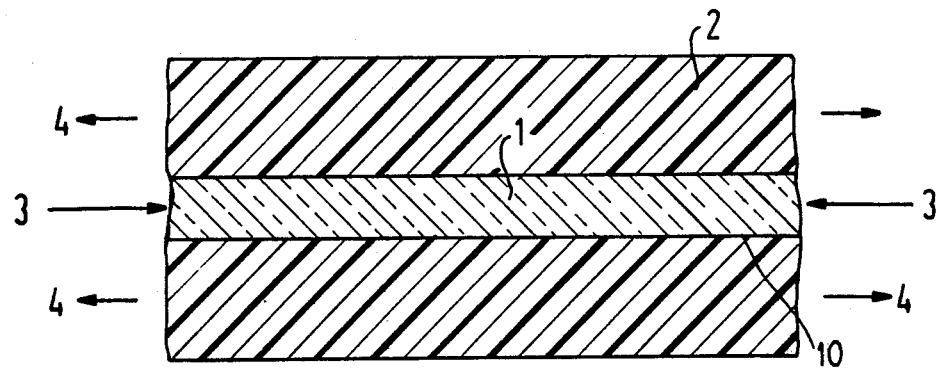
FIG. 1 is a longitudinal cross-sectional view of an optical fiber having a casing in accordance with the present invention.

The principles of the present invention are particularly useful in a communication cable containing one or more light waveguides 1 surrounded with a tight casing 2 as illustrated in FIG. 1. The casing material is applied in such a manner that it is in constant tension so that it exerts a constant longitudinal compression as indicated by the arrows 3 on the waveguide 1. As a result of this longitudinal compression, surface cracks in the glass fiber 1 are compressed. The cracks will appear or become enlarged only in the case of a tensile force or bending stresses indicated by the arrows 4 being applied to the glass fiber and being of sufficient magnitude to overcome the compressive forces indicated by the arrows 3.

The longitudinal compression can be achieved, for example, by a suitable selection of the cooling conditions during the extrusion of a thermoplastic synthetic casing so that a controlled shrinkage will occur. The modulus of elasticity of this material must be sufficiently high and preferably about 1500 N/mm$^2$ in order to prevent lateral bending of the light waveguide 1 into the sleeve material 2 due to the longitudinal compressive pressures or forces 3. Bending of this type could, in fact, lead to periodic bending, which, in turn, would increase the light losses. For this same reason, the synthetic casing 2 must possess a specific minimum layer thickness of at least 100 $\mu$m. The maximum thickness is limited by the permitted radius of curvature for any bends in the cable. When a synthetic casing 2, which is too thick is subjected to bending in its edge zones, it suffers stresses beyond its yield point which stresses lead to indeterminate buckling and surface corrugation. With the radius of curvature of 30 mm, the maximum permissible diameter is 3 mm.

Occasionally, it is desirable to form the casing from two layers. In this situation, the exterior layer has a large linear strain range and a low modulus of elasticity and the inner layer consists of a highly resistant material with a smaller linear range.

Figure 2:
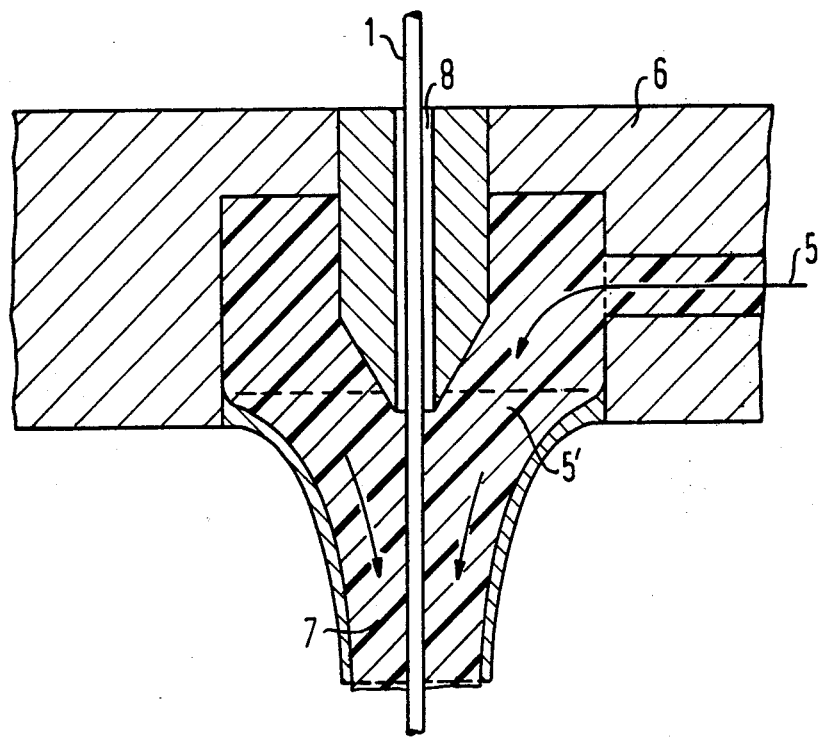
FIG. 2 is a cross-sectional view of a device utilized in applying the casing on the fiber in accordance with the present invention.

Micro-bending of the glass fiber light waveguide can also be caused by irregularities in the synthetic layer. Therefore, it is necessary for the material surrounding the light waveguide to be applied without a coarse structure, without detachment phenomena and without too great a fluctuation in its diameter. This casing can be produced and applied by the following process utilizing a device illustrated in FIG. 2. A hot material which has been homogenized in a heated extruder is conveyed through a channel 5 into a cavity 5' of a special tool 6 so that the material can flow around a glass fiber 1 freely and without pressure. The material will flow outwards through a nozzle 7 as the fiber 1 is drawn or moved therethrough. The thickness of the layer 2 is determined more by the speed of movement of the fiber 1 which determines the amount of the casing material conveyed thereby than on the size of the nozzle 7. Good contact between the fiber 1 and the hot casing material is improved by applying in a vacuum at the die 8 of the tool 6 so that a vacuum is applied adjacent the interface of the fiber 1 and the mass of casing material in chamber 5'.

In addition to this free flow process, it is also possible to employ the classical pressure casting process or a tube stretching process. For controlled cooling of the coated fiber, a longer air cooling section, which will be dependent upon the withdrawal speed, is required. In order to avoid too great a temperature gradient, reheating with a hinged muffle furnace may be required. The air cooling section must also be protected from uncontrolled flows or drafts which might otherwise prevent a uniform layer from being produced. At the end of the air cooling section, a water trough, in particular a trough containing warm water, can possibly be utilized to complete the cooling.

In order to simplify a later removal or stripping of the plastic sleeve or casing 2 from the fiber 1, the glass fiber 1 can be provided with an additional thin film 10 of lacquer or lubricant (FIG. 1) which film 10 is advantageously thinner than 10 $\mu$m. This film 10 must be selected to be such that its adhesive friction to the hot plastic in the chamber 5' (FIG. 2) is sufficient to facilitate the formation of a uniform coating to coating 2 on the fiber; however, the sleeve or casing can still be removed utilizing a removal or stripping tool. The film 10 may be either of such a nature so that a length of a few centimeters can be stripped from the fiber 1 or of such a nature that the plastic sleeve 2 can slide thereon for removal.

The longitudinal compression applied to the fiber 1 to protect the surface thereof, can be increased by impregnating the casing 2 with filaments that are placed in tension. These filaments may be selected from a group consisting of glass filaments, plastic filaments such as aramide yarns, or steel filaments. The pretensioned filaments or threads will particularly relieve the load in a finished optical cable due to the fact that they apply a greater amount of compressive force on the fibers such as 1. A similar effect can be achieved by spinning or braiding these strengthening filaments onto a surface of the casing 2 and then spraying or applying a second casing or coating which tends to shrink thereon. Advantageously, the second coating can be formed from a group consisting of polyethylenes, polyvinyl chlorides, polyamides and polyurethanes. As in conventional cable structures, the encased fibers can then be stranded together and protected by means of various coating constructions.

With the type of communication cables described hereinabove, although the mechanical reliability of the fiber is substantially improved by the tight casing or sheath, additional cable attenuation $\alpha_z$ due to microbending must also be considered. This additional attenuation $\alpha_z$ remains below 5 dB/km if the core diameter (d) and a numerical aperture ($A_N$) of the light waveguide are correctly selected. It has been empirically discovered that the additional attenuation increases with the third power of the core diameter (d) of the fiber and decreases with the sixth power of the numerical aperture ($A_N$) so that $\alpha_z \sim d^3/A_N^6$. A satisfactory result has been produced for a cable which has a combination of fiber diameter D=62.5 $\mu$m and $A_N$=0.14. It is advantageous to employ light waveguide fibers governed by the equation $d^3/A_N^6 < 40$ mm$^3$ for the described cables.

Although various minor modifications may be suggested by those versed in the art, it should be understood that we wish to embody within the scope of the patent warranted hereon, all such modifications as reasonably and properly come within the scope of our contribution to the art.

We claim:

1. In a communication cable having at least one light waveguide of a glass fiber provided with a close fitting casing, the improvement comprising the casing being of a material with a modulus of elasticity greater then 1500 N/mm$^2$, said casing having a layer thickness of at least 100 $\mu$m and a maximum thickness of 1.5 mm, said casing being prestressed in tension to exert a uniform constant longitudinal compression upon the glass fiber.

2. In a communication cable according to claim 1, which includes an intermediate layer having a thickness of less than 10 $\mu$m disposed between the surface of the glass fiber and the casing.

3. In a communication cable according to claim 1, in which the material of the casing is impregnated with filaments selected from a group consisting of glass, aromatic polyamides and steel filaments, said filaments being under tension.

4. In a communication cable according to claim 1, wherein the material of the casing on a surface is provided with protective filaments under tension and covered by a protective coating.

5. In a communication cable according to claim 1, which includes a plurality of glass fibers with each fiber being provided with a casing, said plurality of glass fibers being stranded together to form a flat cable arrangement.

6. In a communication cable according to claim 1, wherein the cable includes an additional casing selected from a group consisting of polyethylene, polyvinyl chloride, polyamide and polyurethane.

7. In a communication cable according to claim 1, wherein each of the light conducting fibers has a core diameter d and a numerical aperture $A_N$, said numerical aperture and core diameter being governed by the equation $d^3/A_N^6 < 40$ mm$^3$.

8. In a communication cable according to claim 1, wherein the casing material is a thermoplastic material selected from a group consisting of polyester, fluoropolymers, polyamides and polymethacrylates.

* * * * *